United States Patent [19]

Imamura

[11] Patent Number: 4,653,904

[45] Date of Patent: Mar. 31, 1987

[54] EXPOSURE INTENSITY DETECTING SYSTEM FOR COPYING MACHINE

[75] Inventor: Kenji Imamura, Himeji, Japan

[73] Assignee: Ushio Denki Kabushiki Kaisha, Tokyo, Japan

[21] Appl. No.: 797,480

[22] Filed: Nov. 13, 1985

[51] Int. Cl.[4] ........................ G03B 27/74; G03B 27/80

[52] U.S. Cl. ........................................... 355/68; 355/8

[58] Field of Search ...................................... 355/8, 68

[56] References Cited

U.S. PATENT DOCUMENTS

| | | | |
|---|---|---|---|
| 3,914,049 | 10/1975 | Basu et al. | 355/68 |
| 4,352,553 | 10/1982 | Hirahara | 355/68 |
| 4,383,758 | 5/1983 | Honda et al. | 355/68 |
| 4,413,903 | 11/1983 | Corona et al. | 355/68 |
| 4,519,702 | 5/1985 | Shigemura et al. | 355/8 |

*Primary Examiner*—Monroe H. Hayes
*Attorney, Agent, or Firm*—Robert F. Ziems

[57] ABSTRACT

Disclosed herein is an exposure intensity detecting system suitable for use in a copying machine. The detecting system is characterized in that a light-shielding plate is arranged underneath a glass table for an original document and defining therethrough a projection slit and a detection slit which extends in parallel with the projection slit. The intensity of light passed through the detection slit of the light-shielding plate is detected by a photosensor. The detecting system can correctly detect the intensity of light, which is to be used for the exposure of a photosensitive member, without giving any influence to the distribution of light to be employed for the illumination of the original document and to the exposure of the photosensitive member. By controlling the quantity of light to be radiated from a light-source lamp in accordance with detection signals of the photosensor, it is always possible to achieve good exposure and hence to form superb duplicate marks.

4 Claims, 5 Drawing Figures

EXPOSURE INTENSITY DETECTING SYSTEM FOR COPYING MACHINE

BACKGROUND OF THE INVENTION (1) Field of the Invention

This invention relates to an exposure intensity detecting system suitable for use in a copying machine, and more specifically to an exposure intensity detecting system which can achieve correct detection of the intensity of light to be used for the exposure of a photosensitive member of a copying machine without affecting the exposure of the photosensitive member.

(2) Description of the Prior Art

In order to obtain vivid duplicate marks or images of good quality by a copying machine, it is essential to maintain the degree of exposure of its photosensitive member at an optimum level. However, the output of a light-source lamp which is adapted to illuminate each original document tends to drop as time goes on. Furthermore, dirt, smear, smudge and the like deposit on the surfaces of lens, reflectors and the like which serve to project light from the light-source lamp onto the original document. The illuminance on the surface of the original document is thus reduced. In addition, the background color density varies from one original document to another. Accordingly, the degree of exposure of the photosensitive member changes to an undesirable level. As a result, the quality of the duplicate marks is reduced. With a view toward overcoming this problem, it has been proposed to detect the intensity of light to be irradiated onto an original document and then to control the intensity of light to be radiated from a light-source lamp in accordance with the detection signal. The need for this kind of control is high especially for high-grade or advanced models, because they are required to have such performance as forming duplicate marks of high quality.

In a copying machine, a lens system is generally employed to focus an optical image from an original document on a photosensitive layer on a rotary drum. Usually, an optical unit with this lens system incorporated therein has a large volume. For several reasons in which the above-mentioned large volume of such an optical unit is also contained, it is indeed difficult to secure a sufficient space for the installation of a photosensor. For this reason, such a photosensor has conventionally been provided, for example, by forming a slit in a reflector which is combined with its associated light-source lamp and disposing the photosensor behind the reflector in such a way that light strikes the photosensor after its passage through the slit. This method is however accompanied by such problems that the distribution of light to be projected onto an original document is adversely affected by the thus-formed slit and since the position of the slit varies slightly by the expansion of the reflector due to heat given off from its associated lamp, the intensity of light cannot be detected correctly. It is also difficult to machine a slit through a reflector which is in the form of a curved surface.

SUMMARY OF THE INVENTION

An object of this invention is to provide an exposure intensity detecting system suitable for use in a copying machine, which detecting system can correctly detect the intensity of light without giving any influence to the distribution of the light and decreasing the quantity of light to be projected onto the photosensitive member for direct contribution to the formation of a duplicate mark, thereby always permitting the formation of duplicate marks of good quality.

In one aspect of this invention, there is thus provided an exposure intensity detecting system suitable for use in a copying machine equipped with an illumination system, which includes a light-source lamp and a light-focusing reflector and is adapted to define a strip-like illuminated region on a glass table for an original document so as to obtain an optical image of a portion of the original document, said portion corresponding to the illuminated region, by way of a projection slit, and a projection system for projecting the optical image onto a photosensitive member. The exposure intensity detecting system is characterized in that:

a light-shielding plate is arranged underneath the glass table and defining therethrough the projection slit and a detection slit which extends in parallel with the projection slit; and the intensity of light passed through the detection slit of the light-shielding plate is detected by a photosensor.

The quantity of light to be radiated from the light-source lamp may preferably be controlled in accordance with signals from the photosensor.

The exposure intensity detecting system of this invention can correctly detect the intensity of light, which is to be used for the exposure of the photosensitive member, without giving any influence to the distribution of light to be employed for the illumination of the original document and to the exposure of the photosensitive member. By controlling the quantity of light to be radiated from the light-source lamp in accordance with detection signals of the photosensor, it is always possible to achieve good exposure and hence to form superb duplicate marks.

The above and other objects, features and objects of the present invention will become apparent from the following description and the appended claims, taken in conjunction with the accompanying drawings.

DETAILED DESCRIPTION OF THE INVENTION AND PREFERRED EMBODIMENTS

Figure 3:
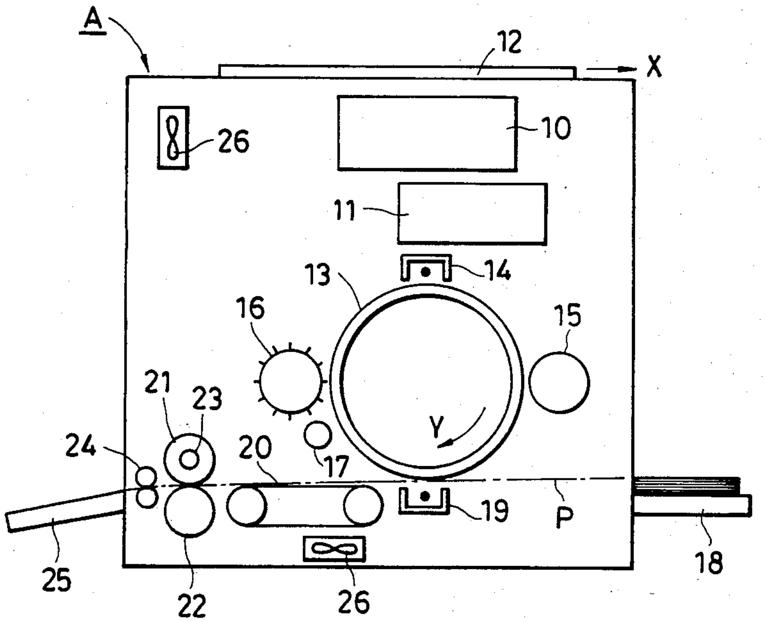
FIG. 3 illustrates by way of example the structural outline of one of copying machines to which the present invention is applicable.

Referring first to FIG. 3, there is illustrated an exemplary copying machine A to which the present invention is applicable. Designated at numeral 12 is a glass table for supporting an original document thereon. The glass table 12 is shifted in a direction indicated by X in one copying process. Right underneath the glass table 12, there are arranged an illumination system 10, which is adapted to illuminate the original document so as obtain an optical image for its projection, and a projection system 11 with a lens system incorporated therein. Still below the projection system 11, a photosensitive drum 13 is provided rotatably, for example, in a direction indicated by an arrow Y. A corona charger 14 is arranged in opposition to the outer circumferential wall of the photosensitive drum 13. Owing to the function of the corona charger 14, a photosensitive layer which is provided on the surface of the photosensitive drum 13 is charged with a specific polarity. An image of the original document is focused on the thus-charged photosensitive layer by the illumination system 10 and projection system 11, whereby a static latent image is formed. Along the direction of rotation of the photosensitive drum 13, there are successively arranged a developer 15, transfer device 19, cleaner lamp 17 and cleaner brush 16 in this order. From the developer 15, toner is caused to adhere corresponding to the static latent image so that a toner image is formed. In the meantime, copy paper is conveyed and fed from a copy paper tray 18 to a point underneath the photosensitive drum 13. By a corona discharge from the transfer device 19, the toner image is transferred onto the copy paper. Letter P indicates the travelling path of each copy paper. Thereafter, the copy paper is conveyed by a conveyor belt 20 to a fixing device composed of a fixing roller 21 and a press roller 22. The copy paper with the toner image lying thereon is heated under pressure between the fixing roller 21, which is heated by a heating lamp 23, and the press roller so that the toner is fused and the toner image is fixed on the copy paper. The resultant copy paper is then fed by discharge rollers 24 onto a table 25 for discharge copy paper, thereby obtaining a duplicate mark. After the transfer of the toner image, the photosensitive layer of the photosensitive drum 13 is cleaned by the cleaner lamp 17 and cleaner brush 16 so that it is rendered ready for use in the next copying process. Designated at numeral 26 is an exhaust fan which takes heat out of the copying machine A.

Figure 1:
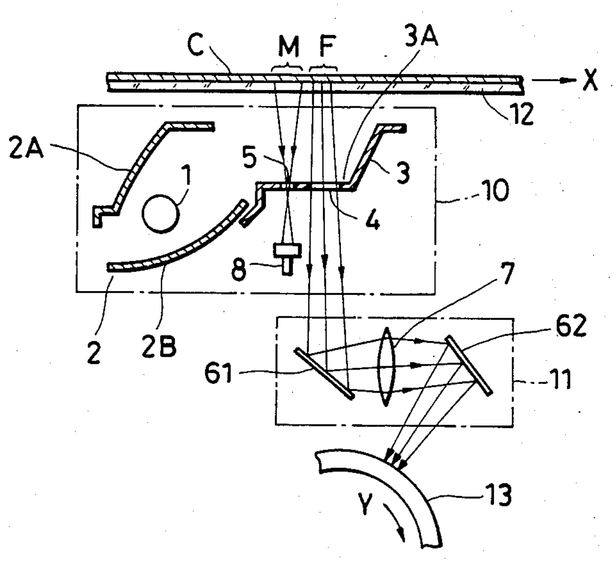
FIG. 1 is a schematic, fragmentary and cross-sectional view of a copying machine in which an exposure intensity detecting system according to one embodiment of this invention has been incorporated.
Figure 2:
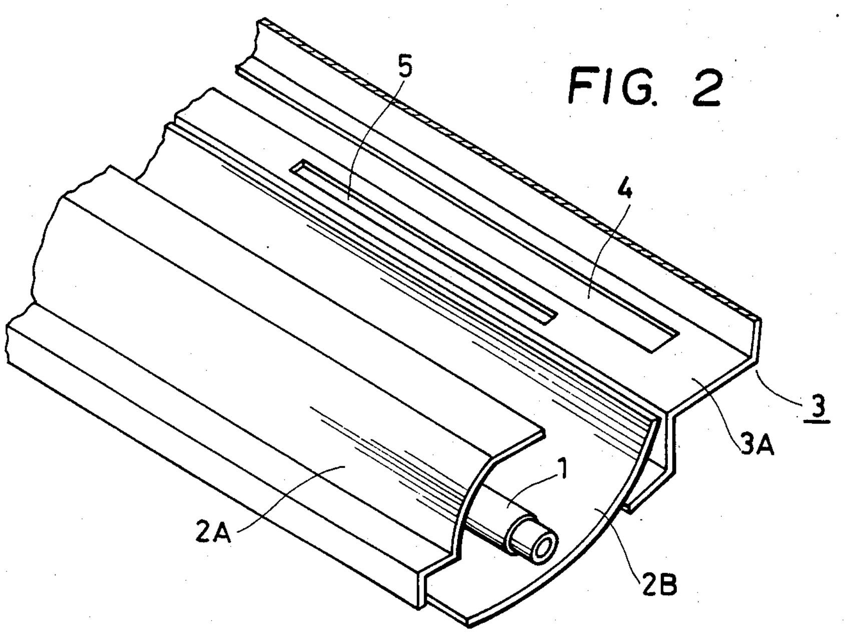
FIG. 2 is a fragmentary perspective view of an illumination system.
Figure 4:
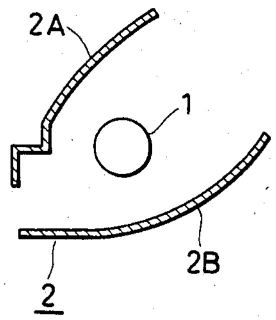
FIG. 4 is a schematic cross-sectional view showing another example of the light-focusing reflector.

In a copying machine such as that described above by way of example, a light-source lamp 1 and a light-focusing reflector 2 are combined together as illustrated in FIGS. 1 and 2 so that the light from the light-source lamp 1 is concentrated on a strip-like region (hereinafter called "the illuminated region") F on the glass table 12 on which an original document C is placed. Here, one or more rod-shaped halogen lamps may be employed as the light-source lamp 1. As the light-focusing reflector 2, any reflectors may be employed so long as the light from the light-source lamp 1 is collected to form the illuminated region F with an effective width of a predetermined size, for example, 8 mm. Specifically, may be employed a gutter-like reflector the cross-sectional shape of which is partly or in its entirety bent along a section of an ellipse, a gutter-like reflector the cross-section of which includes both curved and straight portions and has an elliptical shape as a whole, a gutter-like reflector composed of either curved portions or straight portions and formed as a whole into a gutter-like shape extending along an ellipse, or a reflector made of a plurality of portions and assembled as a whole into such a light-focusing reflector. The light-focusing reflector 2 shown by way of example in FIGS. 1 and 2 is constructed of two portions 2A,2B each of which extends along the light-source lamp 1. A central part in cross-section of the upper reflector portion 2A and the entire part in cross-section of the lower reflector portion 2B have such configurations that they extend along an ellipse, while both end portions in cross-section of the upper reflector portion 2A are straight. A reflector shown in FIG. 4 is basically similar to the reflector depicted by way of example in FIGS. 1 and 2. However, central parts in cross-section of the portions 2A,2B are each formed of a number of straight portions which are arranged along an ellipse. The light-source lamp 1 is disposed at or near the focal or pseudofocal point of the light-focusing reflector 2.

A light-shielding plate 3 is provided adjacent to the reflector portion 2B of the light-focusing reflector 2. The light-shielding plate 3 includes a planar portion 3A which extends in parallel to the glass table 12 at a point below the illuminated region F of the glass table 12. The planar portion 3A defines a projection slit 4, through which an optical image of a portion of the original document C, which portion corresponds to the illuminated region F, is allowed to reach a reflector 61 of the projection system 11. The optical image reflected by the reflector 61 is focused on the photosensitive layer of the photosensitive drum 13 through a spherical lens and a reflector 62 so as to achieve the exposure of the photosensitive layer. Incidentally, the spherical lens 7 and the reflector 62 may be movably designed to provide the copying machine with an enlarging and reducing function.

Through the planar portion 3A of the light-shielding plate 3, another slit, namely, a detection slit 5 is additionally formed in parallel with the projection slit 4. This detection slit 5 permits passage of light from a slit-like detection region M located, for example, adjacent to the illuminated region F on the glass table 12. In the illustrated embodiment, the detection region M is located right before the illuminated region F and has an effective width of 4 mm so that when the glass table 12 is shifted in the direction indicated by the arrow X, a portion of the original document positioned on the detection region M reaches the illuminated region F. It should however be borne in mind that the detection region M is not necessarily limited to the above specification. It is thus possible to provide the detection region M in such a way that a part of the detection region M overlaps the illuminated region F. This detection slit 5 has a width in the range of 0.5–1 mm or so. Unlike the projection slit 4, the detection slit 5 is not required to have a length equal to the effective length in the widthwise direction (namely, in the direction perpendicular to the drawing sheet in FIG. 1) of the glass table 12 for original documents. A length as short as several centimeters is enough.

Below the planar portion 3A, a photosensor 8 is provided in accordance with the detection slit 5. Thus, the light from the detection region M is limited by the detection slit 5 so that the light strikes on the photosensor 8 with a width, for example, of 2 mm.

Figure 5:
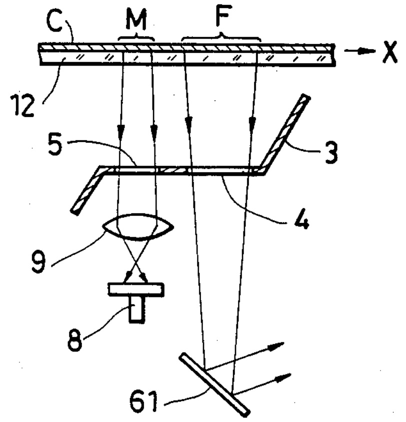
FIG. 5 is a schematic cross-sectional view showing a modification of the exposure intensity detecting system of FIG. 1.

Alternatively, a lens 9 may be provided in accordance with the detection slit 5 as shown in FIG. 5 so that the light from the detection slit 5 is allowed to strike the photosensor 8 after its condensation through the lens 9. In this embodiment, the width of the detection slit 5 may be designed wider so as to facilitate the introduction of the light with an intensity corresponding to the sensitivity characteristics of the photosensor 8.

According to the above embodiments, the light which has passed through the detection slit 5 and does not contribute at all to the exposure of the photosensitive drum 13 is caused to strike the photosensor 8 and moreover, the intensity of the light corresponds to the illuminance of the detection region M. Since the illuminance of the detection region M is obviously in conformity with the illuminance of the illuminated region F, the output of the photosensor 8 corresponds, as a consequence, to the intensity of the light to which the photosensitive drum 13 is exposed. It is therefore possible to control the intensity of the light, which is employed for the exposure of the photosensitive drum 13, always within a predetermined intensity range by controlling the quantity of light to be radiated from the light-source lamp 1 with a suitable known control device for the light-source lamp in accordance with detection signals from the photosensor 8, for example, by means of a control device which increases and decreases the power to be input to the light-source lamp 1. As a result, it is possible to avoid intensity variations of the exposing light due to reductions to the quantity of light radiated from the light-source lamp 1 and other causes.

Since the photosensor 8 detects the intensity of the light which has passed through the detection slit 5 and does not contribute at all to the exposure of the photosensitive drum 13, the formation of each duplicate mark is not affected at all by the detection of the light. The above detection can be performed without need for any modification to the light-focusing reflector 2 which is used in combination with the light-source lamp 1. Different from the conventional system in which a slit is formed through the light-focusing reflector, the light distribution characteristics of the light-focusing reflector 2 is hence not affected adversely. Furthermore, the light-shielding plate 3 is practically unaffected by heat from the light-source lamp 1. The position and width of the detection slit 5 do not thus vary, whereby correct detection is always feasible and a high degree of reliability is hence obtained. Owing to the formation of the detection slit 5 along with the projection slit 4 in the light-shielding plate 3, no separate member is required for the provision of the detection slit 5. Accordingly, the number of parts is not increased and especially, it is not necessary to secure any extra space for the detection slit 5. Furthermore, the light-shielding plate 3 is usually in the form of a plate. It is thus easy to form the detection slit 5 therethrough.

Having now fully described the invention, it will be apparent to one of ordinary skill in the art that many changes and modifications can be made thereto without departing from the spirit or scope of the invention as set forth herein.

What is claimed is:

1. In an exposure intensity detecting system suitable for use in a photocopying machine equipped with a transparent plate for contacting an original document and an illumination system including a lamp positioned on one side of the transparent plate and a light-focusing reflector, said illumination system being adapted to define an illuminated strip on the transparent plate in order to obtain an optical image of a portion of the original document in register with the illuminated strip, and a projection system for projecting the optical image onto a photosensitive member, the improvement comprising:

a light-shielding plate positioned on the same side of the transparent plate as the lamp, said light-shielding plate defining a projection slit, through which the optical image is projected onto the photosensitive member, and a detection slit parallel to said projection slit, said detection slit being positioned to allow the passage therethrough of light from a detecting region on the transparent plate; and a photosensor for controlling the intensity of light to be irradiated from the lamp, said photosensor being positioned to receive the light from the detecting region passing through said detection slit.

2. An exposure intensity detecting system as claimed in claim 1, wherein the light-focusing reflector is one of an ellipsoidal reflector and a set of reflectors functioning together essentially as an ellipsoidal reflector, the lamp being disposed at the focal point of the light-focusing reflector.

3. An exposure intensity detecting system as claimed in claim 1, including a condenser lens positioned between said detection slit and said photosensor.

4. An exposure intensity detecting system as claimed in claim 1, wherein the width of the detection slit is 0.5–1 mm.

* * * * *